(12) United States Patent
Lee

(10) Patent No.: US 8,276,783 B2
(45) Date of Patent: Oct. 2, 2012

(54) CONTAINER FOR FOOD AND BEVERAGE

(76) Inventor: Jung-Min Lee, Seoul (KR)

( * ) Notice: Subject to any disclaimer, the term of this patent is extended or adjusted under 35 U.S.C. 154(b) by 1112 days.

(21) Appl. No.: 10/535,885

(22) PCT Filed: Nov. 25, 2003

(86) PCT No.: PCT/KR03/02565
§ 371 (c)(1),
(2), (4) Date: May 23, 2005

(87) PCT Pub. No.: WO2004/048208
PCT Pub. Date: Jun. 10, 2004

(65) Prior Publication Data
US 2006/0060589 A1    Mar. 23, 2006

(30) Foreign Application Priority Data

| Nov. 25, 2002 | (KR) | 10-2002-0075095 |
| Nov. 30, 2002 | (KR) | 10-2002-0076435 |
| Dec. 4, 2002 | (KR) | 10-2002-0078029 |
| Dec. 9, 2002 | (KR) | 10-2002-0079379 |
| Dec. 11, 2002 | (KR) | 10-2002-0080515 |

(51) Int. Cl.
*B65D 41/16* (2006.01)

(52) U.S. Cl. ........ 220/780; 220/705; 220/706; 220/707; 220/708; 220/709; 220/717; 220/380; 220/796; 215/229; 215/388; 229/404; 229/906.1; 206/508; 206/519

(58) Field of Classification Search ............ 215/229, 215/388; 220/705–709, 713, 796; 229/404, 229/906

See application file for complete search history.

(56) References Cited

U.S. PATENT DOCUMENTS

| 4,508,235 A | 4/1985 | Steele et al. ........... 215/307 |
| 4,537,325 A | 8/1985 | Zieff ..................... 220/234 |
| 5,076,425 A | 12/1991 | Plone .................... 206/220 |
| 5,253,781 A | 10/1993 | Van Melle et al. ....... 220/713 |
| 5,497,879 A | 3/1996 | Kao ......................... 6/389 |
| 6,082,575 A * | 7/2000 | Skoskiewicz et al. ..... 220/711 |
| 6,196,413 B1 * | 3/2001 | Tung .................... 220/709 |
| 2003/0089714 A1 * | 5/2003 | Dart et al. .............. 220/254.3 |

FOREIGN PATENT DOCUMENTS

JP    59-109563    7/1984

* cited by examiner

*Primary Examiner* — Anthony Stashick
*Assistant Examiner* — Elizabeth Volz
(74) *Attorney, Agent, or Firm* — Westman, Champlin & Kelly, P.A.

(57) ABSTRACT

A food/beverage container includes a cup-shaped main body for containing liquid content, and a cap having a hemisphere body provided with a spouting portion. The cap is designed to be normally or inversely fitted on the cup-shaped main body. The cap includes a first coupling part along an outer circumference configured to attach to and tightly contact a coupling edge of the container for normal fitting in an opposed second coupling part positioned opposite the first coupling part for inversely fitting to the cup-shaped main body.

5 Claims, 12 Drawing Sheets

[FIG 11]
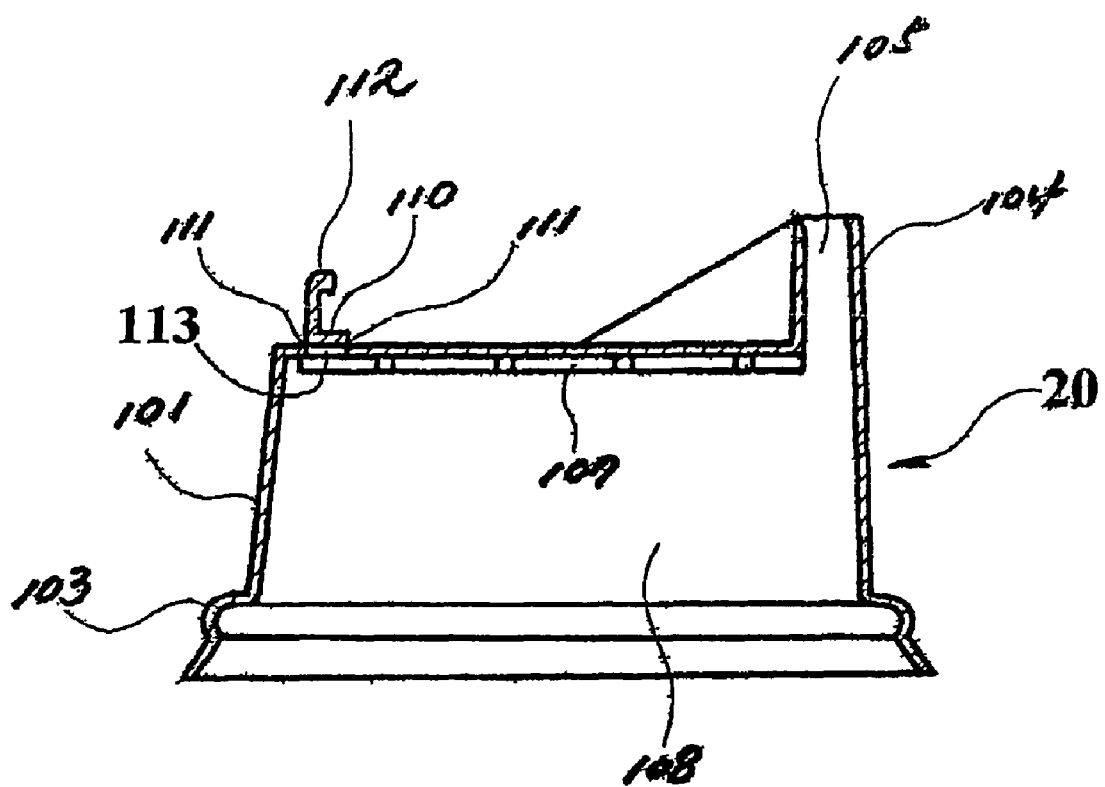

[FIG 12]
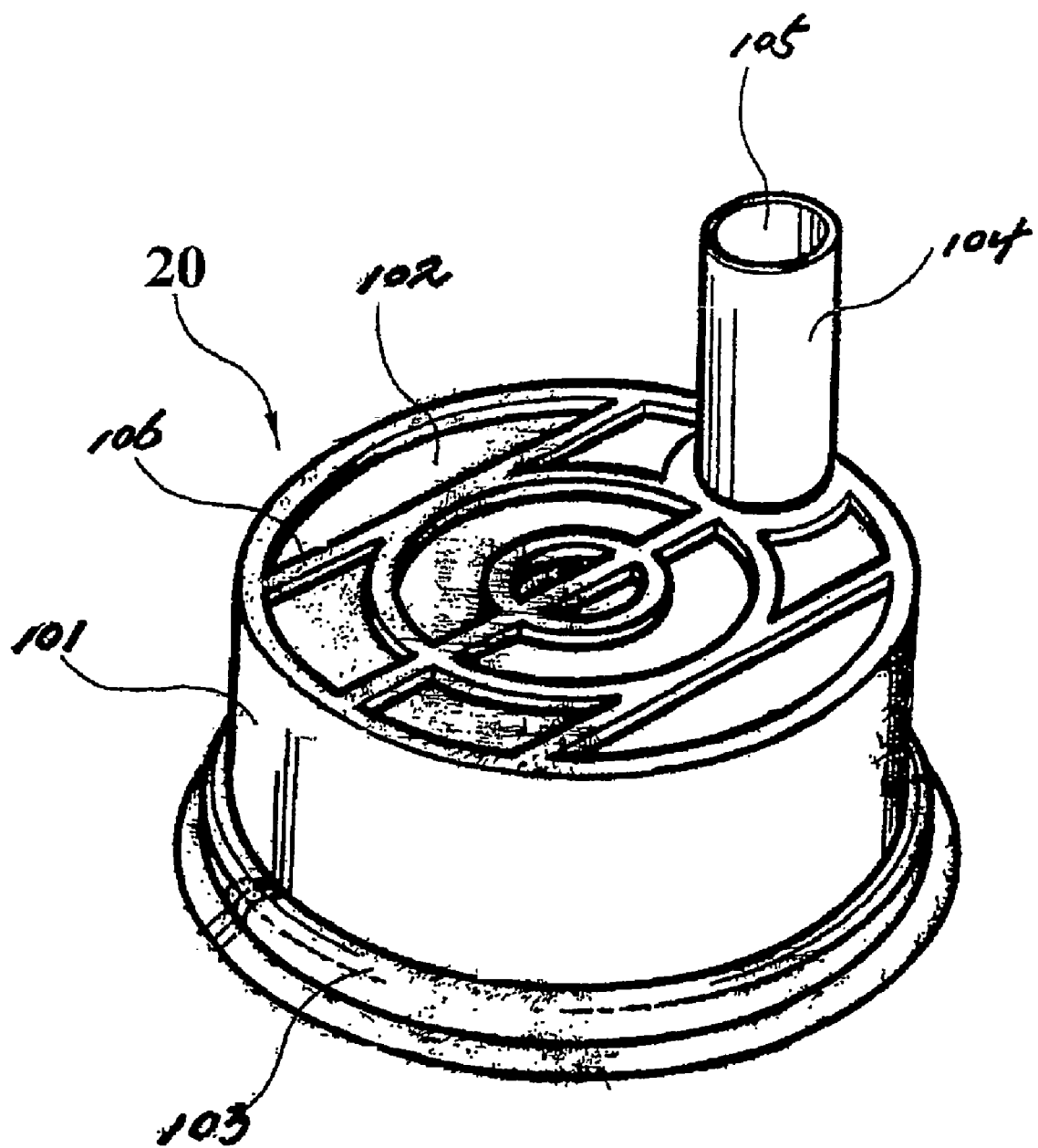

CONTAINER FOR FOOD AND BEVERAGE

CROSS-REFERENCE TO RELATED APPLICATION

This Application is a Section 371 National Stage Application of International Application No. PCT/KR2003/002565, filed Nov. 25, 2003 and published as WO 2004/048208 A2 on Jun. 10, 2004, and published in English, the content of which is hereby incorporated by reference in its entirety.

FIELD OF THE INVENTION

The present invention relates to a container for food and beverage that has a dome-shaped cap that can be inversely fitted on a container body so that the container can be used for a variety of uses.

That is, when the cap is normally fitted on the container body, a user can drink beverage in the container body. When the cap is inversely fitted on the container body, the use can dispose food such as ground coffee or other instant food.

BACKGROUND OF THE INVENTION

Generally, as the instant food and beverage industry has been developed, a variety of food sets and menu has been launched.

The food and beverage are completely packed in a factory and come to the market. However, at a small shop where favorite food and beverage are sold, the food and beverage are instantly prepared by, for example, filling the food and beverage into a container. However, to meet favorite of customers, there is a need for preparing a variety of containers. However, it is difficult to prepare the variety of containers in the small store.

For example, in the case of normal coffee, it is filled in the container body and a flat type cap closes the opening of the container body. In the case of foamy cream coffee, a dome-shape cap should be used to close the opening of the container body.

That is, in a conventional food container, a flat cap is provided with a spouting portion and a plurality of holes. A filtering paper is inserted on a top of the cap so that the user can instantly drip a ground coffee.

However, the conventional food container has an advantage of instantly dripping the coffee, it is impossible to stably drink the contents through the cap.

As described above, the conventional food container cap is used only for a single purpose. That is, it cannot be used for the multi-purpose.

SUMMARY OF THE INVENTION

Therefore, the present invention has made in an effort to solve the above-described problems of the conventional art.

It is an objective of the present invention to provide a container for food and beverage that has a dome-shaped cap that can be inversely fitted on a container body so that the container can be used for a variety of uses. That is, when the cap is normally fitted on the container body, a user can drink beverage in the container body. When the cap is inversely fitted on the container body, the use can dispose food such as ground coffee or other instant food.

To achieve the above objective, the present invention provides a 1. A food/beverage container comprising a cup-shaped main body for containing liquid content; and a cap having a hemisphere body provided with a spouting portion, spout assembly for a liquid container, the cap being designed to normally or inversely fitted on the cup-shaped main body.

The cap comprises a first coupling part for the normal fitting on the main body and a second coupling part for the inverse fitting on the main body.

The main body is provided at an upper end with a coupling circumference.

The spouting portion is provided with a spouting member insertion hole.

The hemisphere body is provided at an inner surface with a ribs.

The hemisphere body is provided at an inner surface with a flow guide passage or groove.

The cap is provided with an air intake portion.

BRIEF DESCRIPTION OF THE DRAWINGS

FIGS. 11 and 12 are respectively sectional and perspective views of a cap according to a fourth embodiment of the present invention.

DETAILED DESCRIPTION OF THE PREFERRED EMBODIMENTS

Preferred embodiments of the present invention will be described more in detail hereinafter in conjunction with the accompanying drawings.

Figure 1:
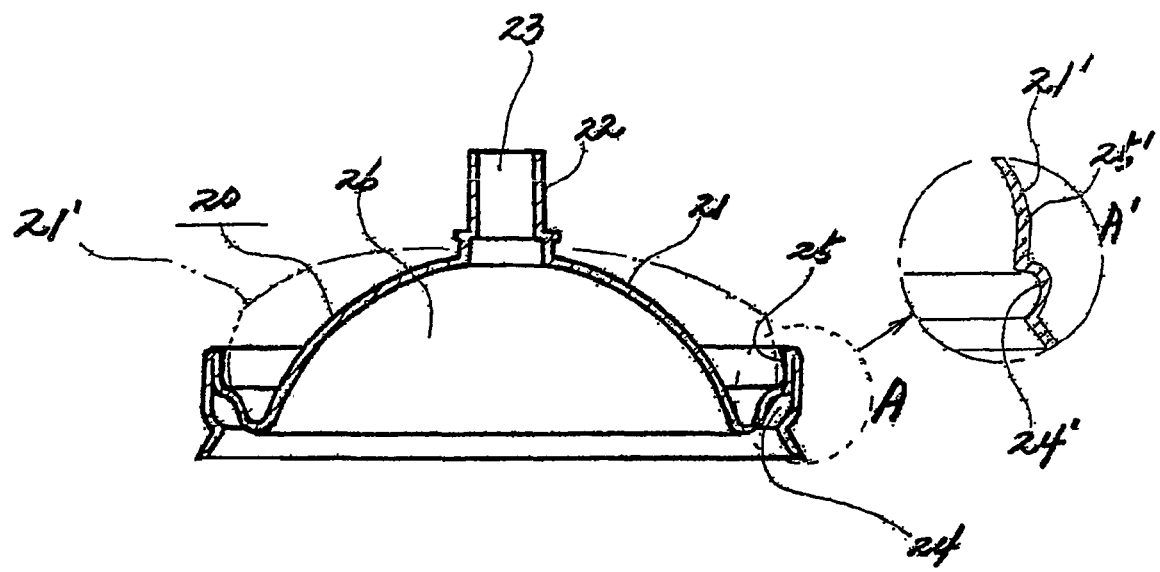
FIG. 1 is a sectional view illustrating a cap of a container according to according to a first embodiment of the present invention.
Figure 2:
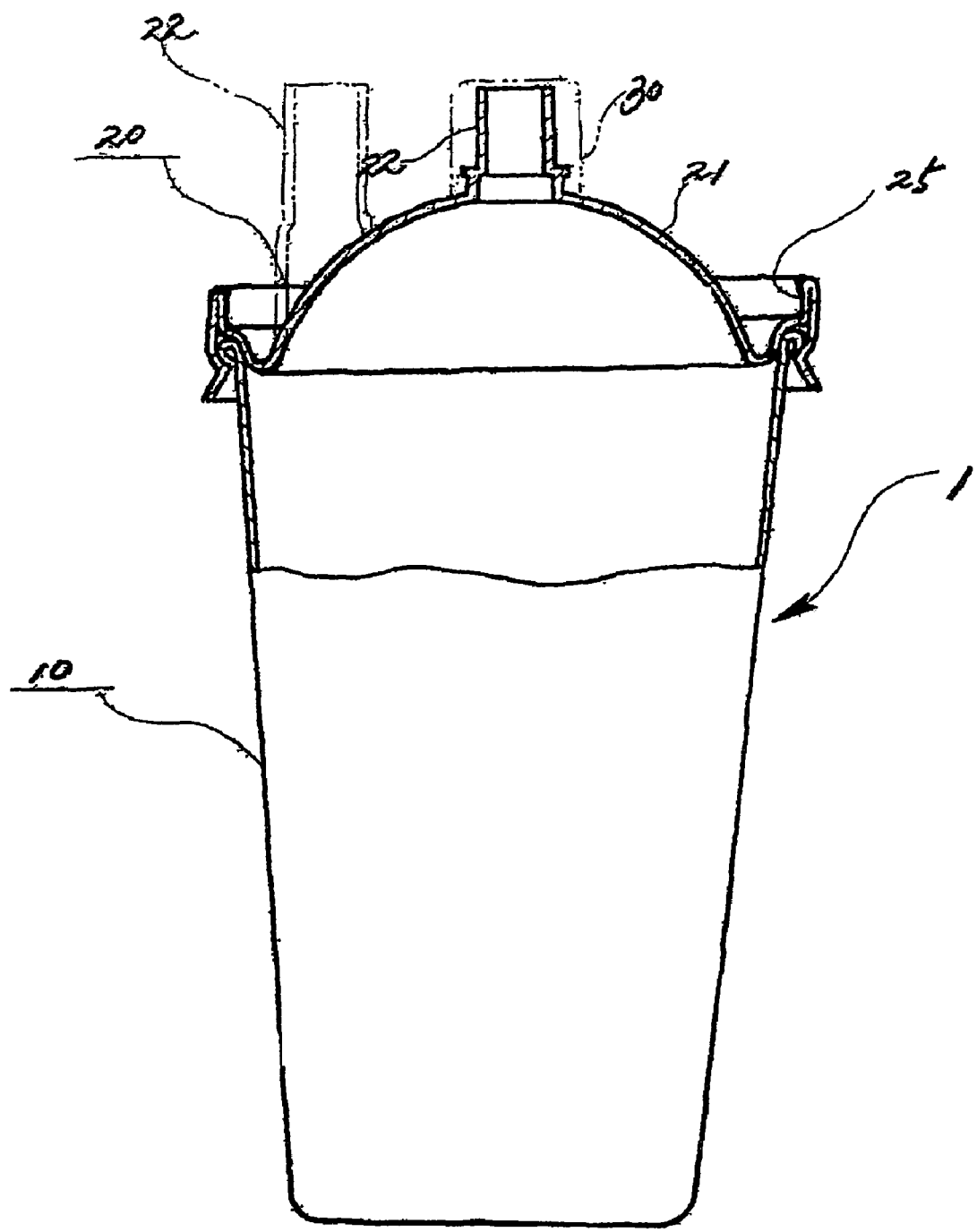
FIG. 2 is a sectional view illustrating an assembled state of a container according to a first embodiment of the present invention.

As shown in FIGS. 1 and 2, the inventive food/beverage container 1 comprises a cup-shaped body 10 for containing liquid contents and a cap 20 assembly on an opened top of the cup-shaped body 10.

The cup-shaped body 10 is provided at an upper end with a coupling edge 111 that may be formed in a circumferential projection or groove. Alternatively, the coupling edge 11 may be formed in a screw-type. The cup-shaped body 10 may be formed through one of an injection molding, a press forming, a vacuum pressure forming, and a thermal forming.

The cap 20 is formed in a dome-shape having a hemisphere portion 21. The hemisphere portion 21 is provided with a spouting portion 22 having a spouting member insertion hole 23. The hemisphere portion 21 is further provided with first and second coupling parts 24 and 25 that are designed to be coupled with the coupling edge 11 of the cup-shaped body 10. The first coupling part 24 is for coupling the cap 20 in a normal direction. The second coupling part 25 is for coupling the cap 20 in an inverse direction. The use of the first and second coupling parts 24 and 25 can be selected by the user.

The spouting portion 22 can be projected upward or downward from the hemisphere portion 21. The spouting portion 22 is designed to be covered a closer 30. The closer 30 can be formed in a one-touch opening and a screw type. In addition, the spouting portion 22 may be formed to be bent in a direction.

Figure 3:
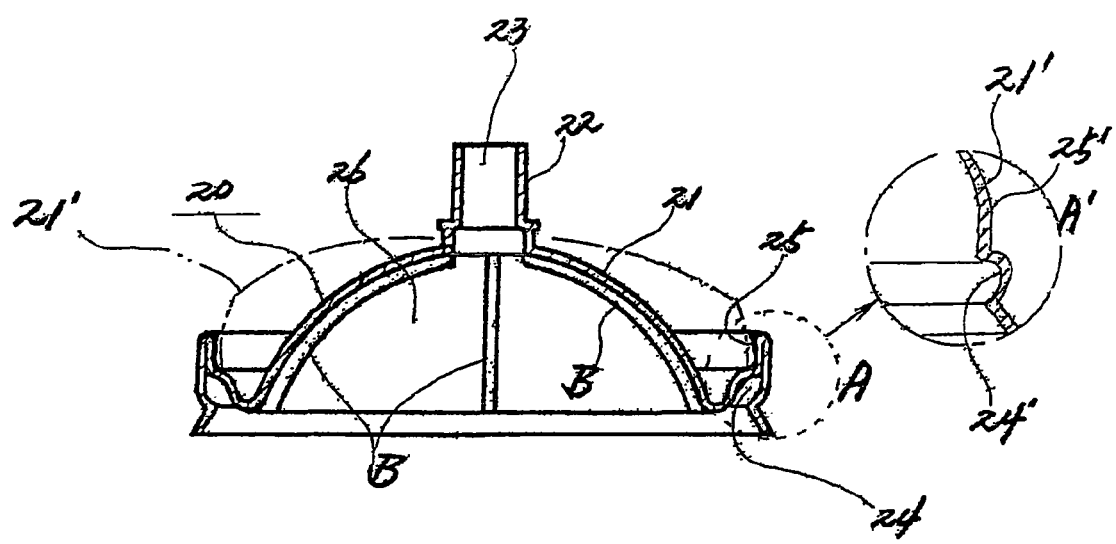
FIG. 3 is a sectional view of a container cap according to a second embodiment of the present invention.
Figure 4:
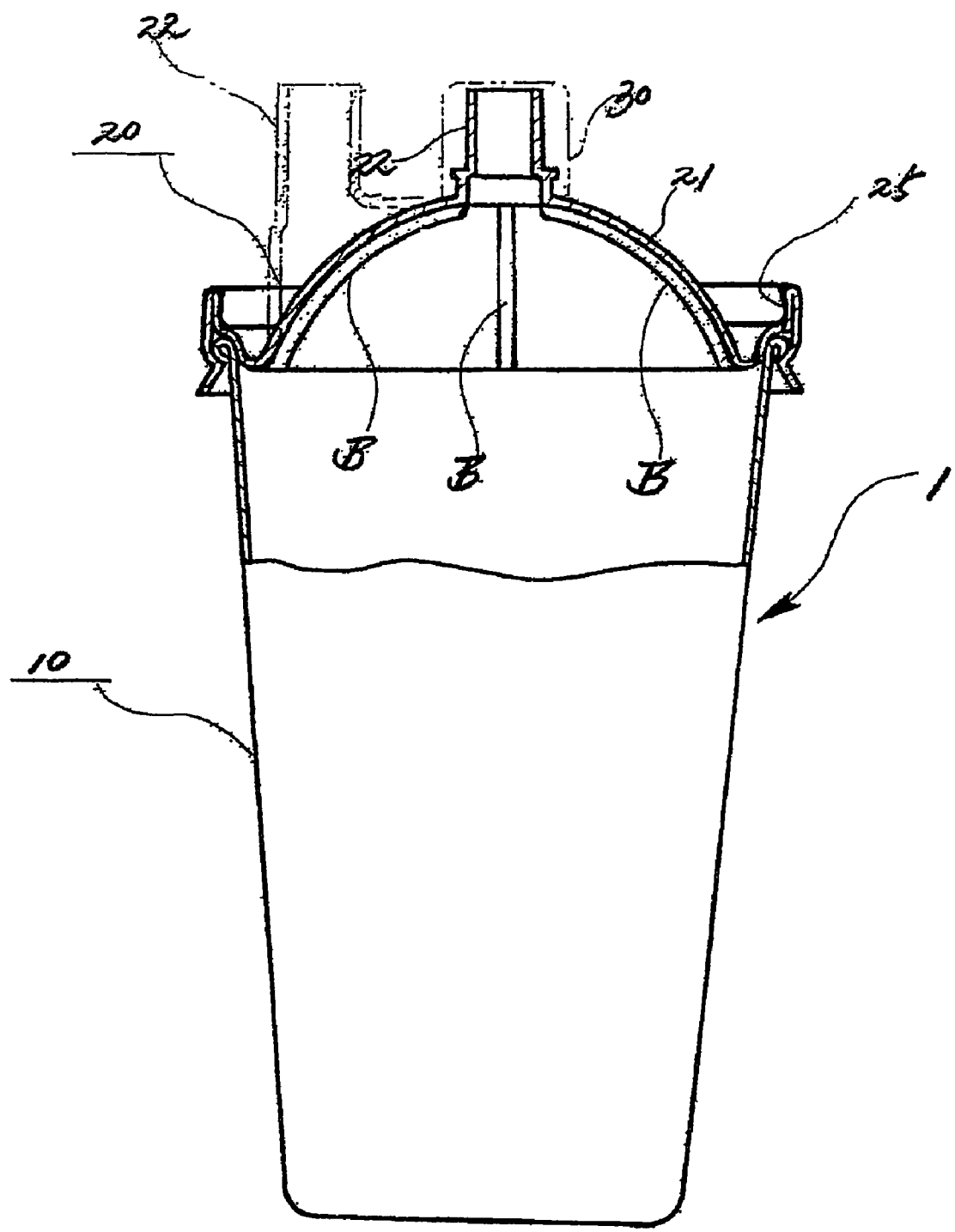
FIG. 4 is a partial sectional view of an assembly container with a cap depicted in FIG. 3.

FIGS. 3 and 4 show a second embodiment of the present invention.

As shown in the drawings, the food/beverage container 1 is identical to that in the first embodiment.

However, The hemisphere portion 21 (21') is provided at an inner bottom with ribs B for guiding the flow of fluid. The ribs B are formed directing the spout insertion hole 23.

The ribs B prevent the filtering paper from adhering to the inner bottom surface of the hemisphere portion 21. Accordingly, when dripping coffee, the ribs B allow the fluid passing through the filtering paper to effectively flow.

The operation effect of the present invention will be described hereinafter.

Figure 5:
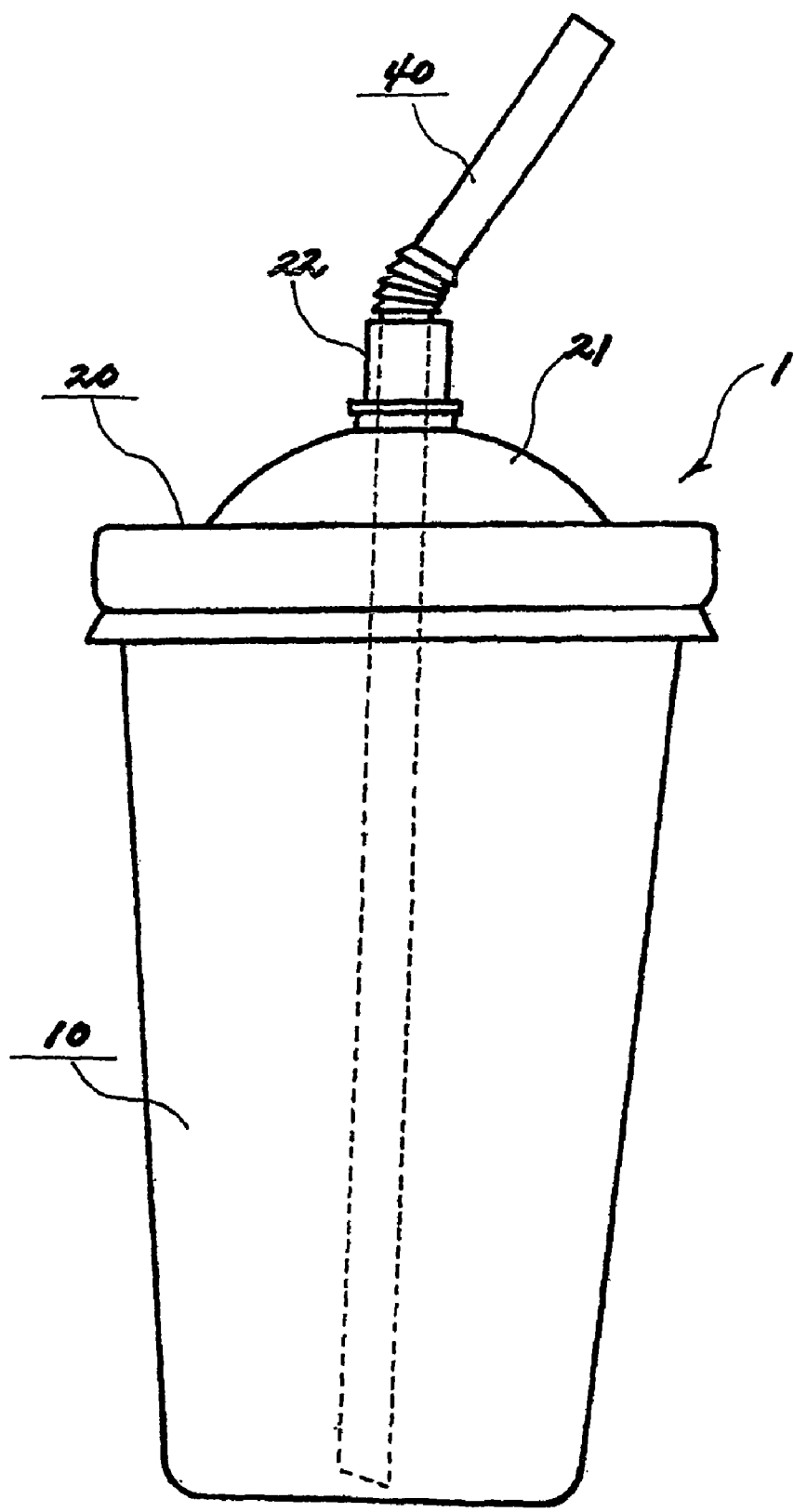
FIG. 5 is a front view illustrating an example where a spout assembly is assembled on a container according to the present invention.

Referring first to FIG. 5, the cap 20 is assembly on the main body 10. A spouting member 40 is assembled on the spouting portion of the cap 20. When sucking the spouting member 40, the user can drink the contents in the main body 10. At this point, to prevent the main body 10 from being contracted by inner vacuum, the spouting portion 22 is provided with a longitudinal groove so that external air can be introduced into the main body 10 when drinking the contents. Alternatively, the spouting member 40 is provided at an outer portion with a longitudinal groove to prevent the inner vacuum generation.

Since the cap 20 is formed by a hemisphere portion 21, when cream foam is generated in the main body 10, the hemisphere portion 21 absorb the volume of the cream foam.

Figure 6:
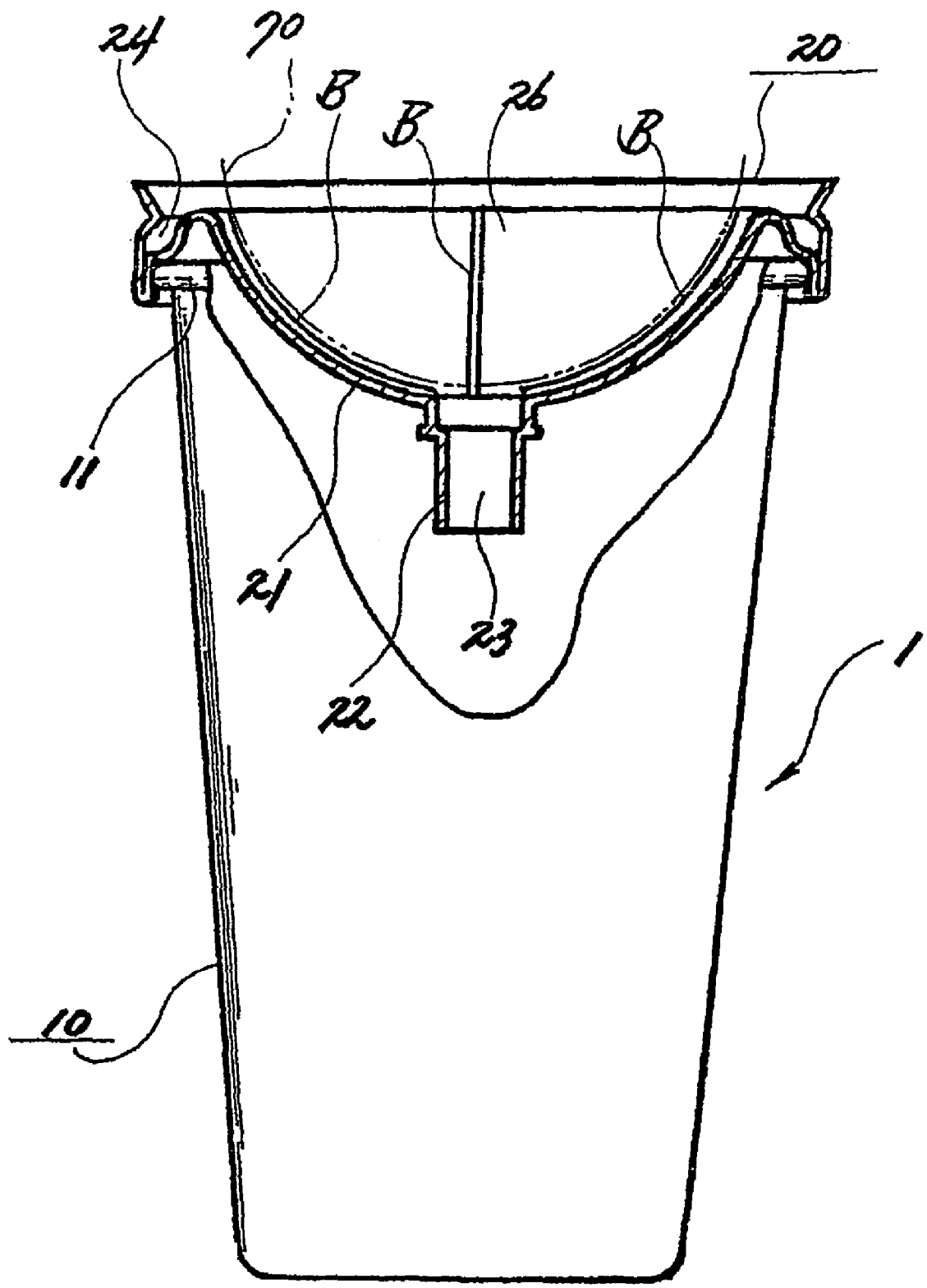
FIGS. 6 and 7 are sectional views illustrating a state where a cap is inversely fitted on a container body according to the present invention.

In another example, as shown in FIG. 6, the cap 20 may be inversely fitted on the main body 10 using the second coupling part 25.

Figure 7:
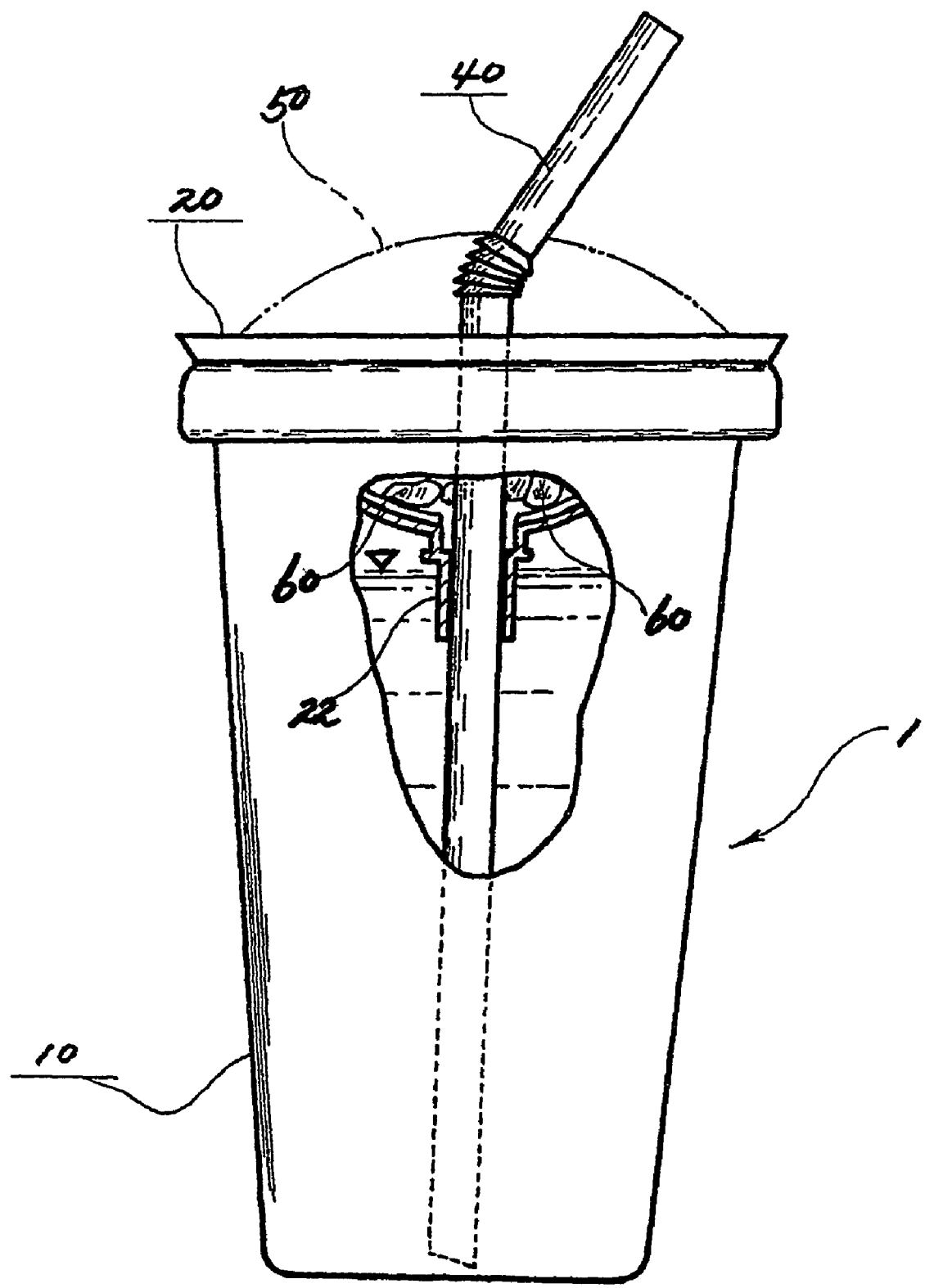

In use, as shown in FIG. 7, the spouting member 40 is inserted through the spout insertion hole 23 of the spouting portion 22, and food 60 such as snack is contained in a concave portion 26 of the cap 20.

In this state, the user can drink the contents through the spouting member, eating the food contained in the cap 20.

A sub-cap 50 for covering the food 60 contained in the cap 20 may be further provided.

The spouting portion 22 formed on the hemisphere portion 21 of the cap 20 can receive the spouting member 40.

As shown in broken line of FIG. 3, the second coupling part 25 is designed such that a circumference of the main body 21' tightly contacts an upper-inner wall of the main body 10 to be deeply fitted in the main body 10 at a predetermined depth.

Describing more in detail, a portion "A" shown in FIG. 3 can be altered in "A'". That is, the circumference of the hemisphere portion 21' functions as the second coupling part 25'.

Meanwhile, as shown in FIG. 6, in a state where the cap 20 is inversely fitted on the main body 10, a filtering paper 70 is disposed in the concave space of the cap 20. When ground coffee is filled in the filtering paper 70 and water is supplied, the content is collected on the spout insertion hole 23 along the rib B formed on the cap 20.

Figure 8:
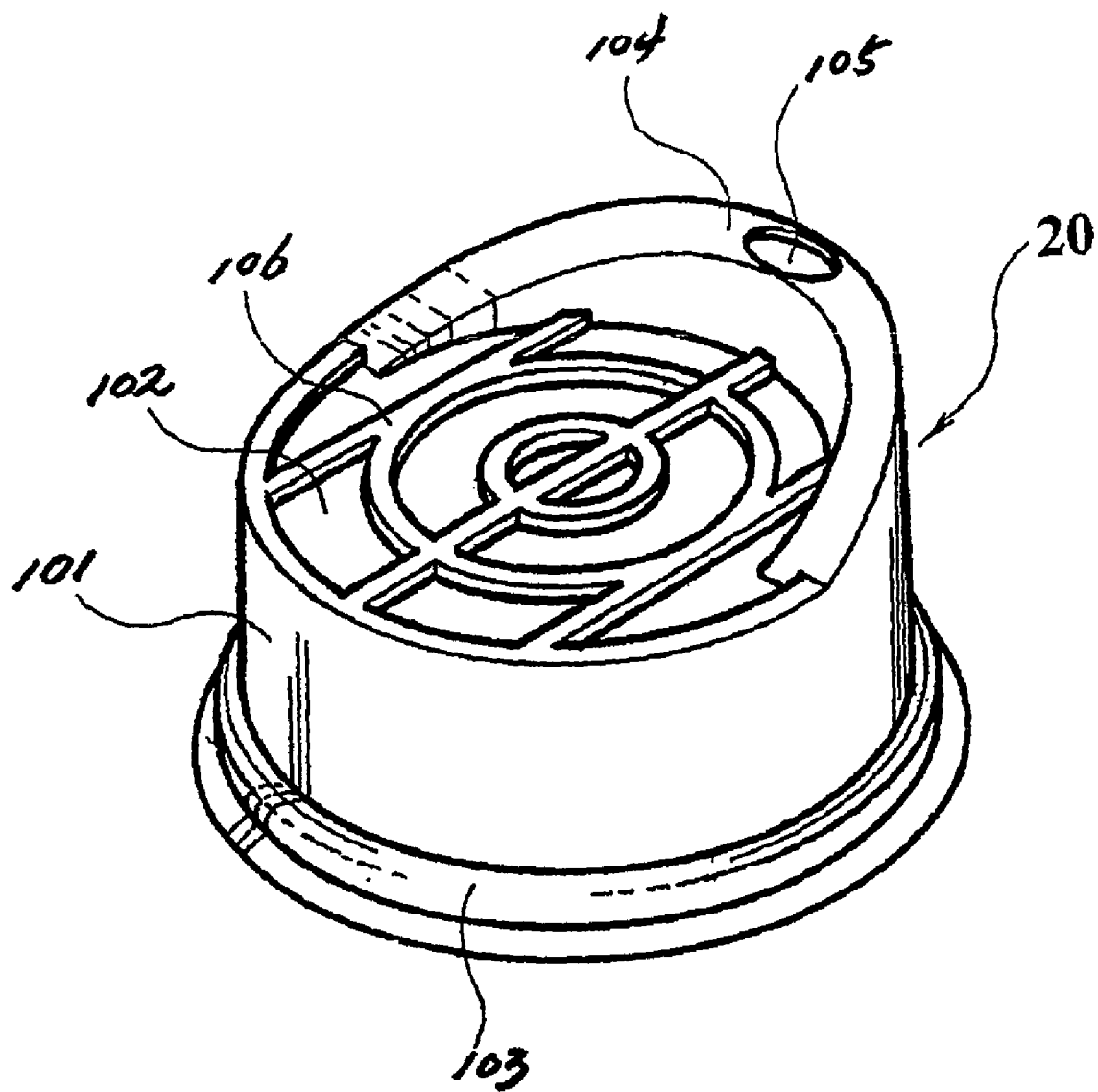
FIG. 8 is a perspective view of a cap according to a third embodiment of the present invention.
Figure 9:
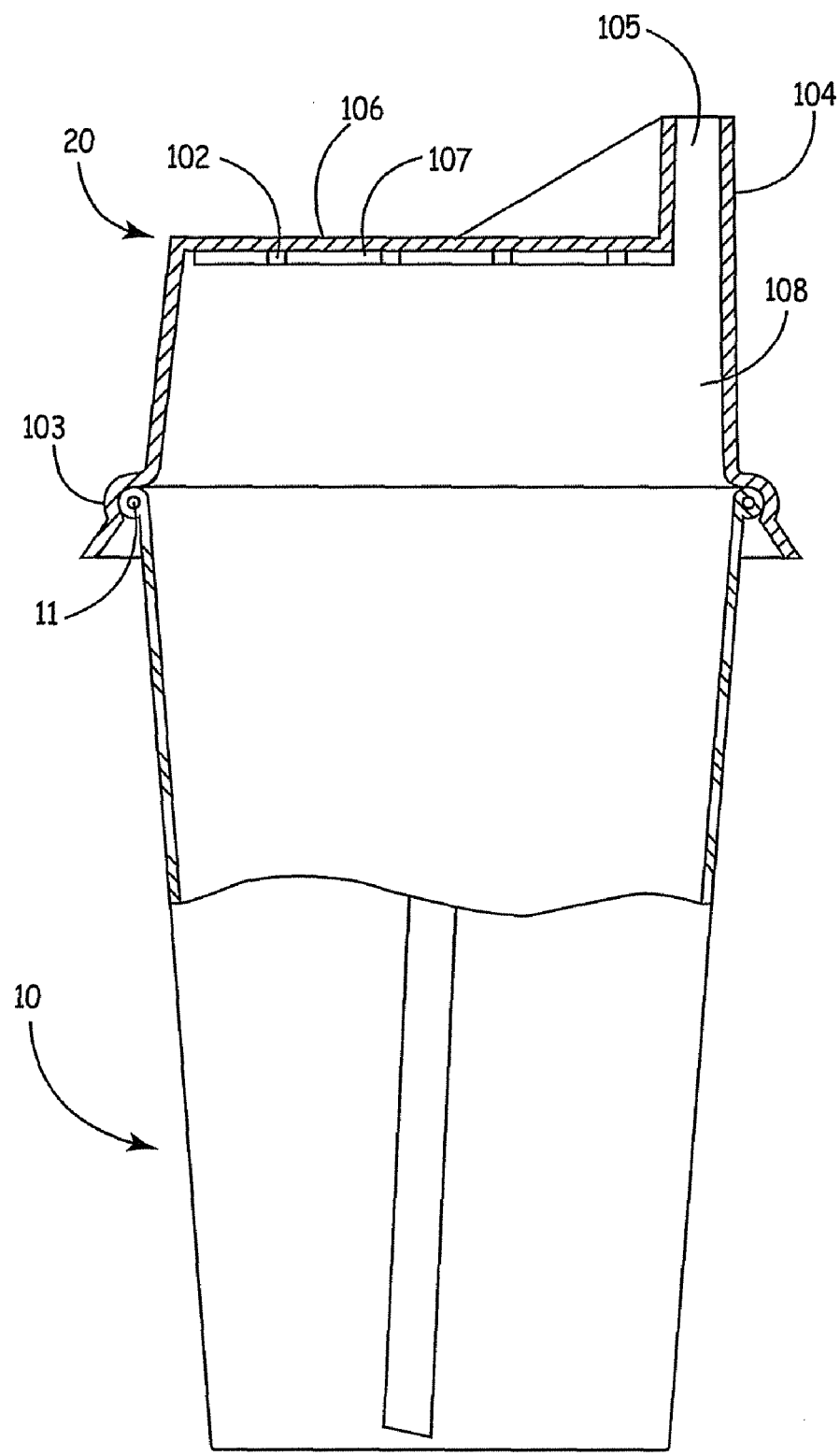
FIG. 9 is a partial sectional view of an assembled container with a cap depicted in FIG. 8.

FIGS. 8 and 9 show a third embodiment of the present invention.

As shown in the drawings, a cap 20 of a food/beverage container according to this embodiment includes a side portion 101 and a top portion 102.

The side portion 101 is provided at a lower end with a first coupling part 103 for coupling to a coupling circumference 11 of a main body 10.

A spouting portion 104 provided with a spouting hole 105 is formed on a portion of the top portion 102. A flowing guide passage 106 directing to the spouting portion 104 is formed on the top portion 102. That is, the flowing guide passage 106 is connected to the spouting portion 104.

The operational effect of this embodiment will be described hereinafter.

Figure 10:
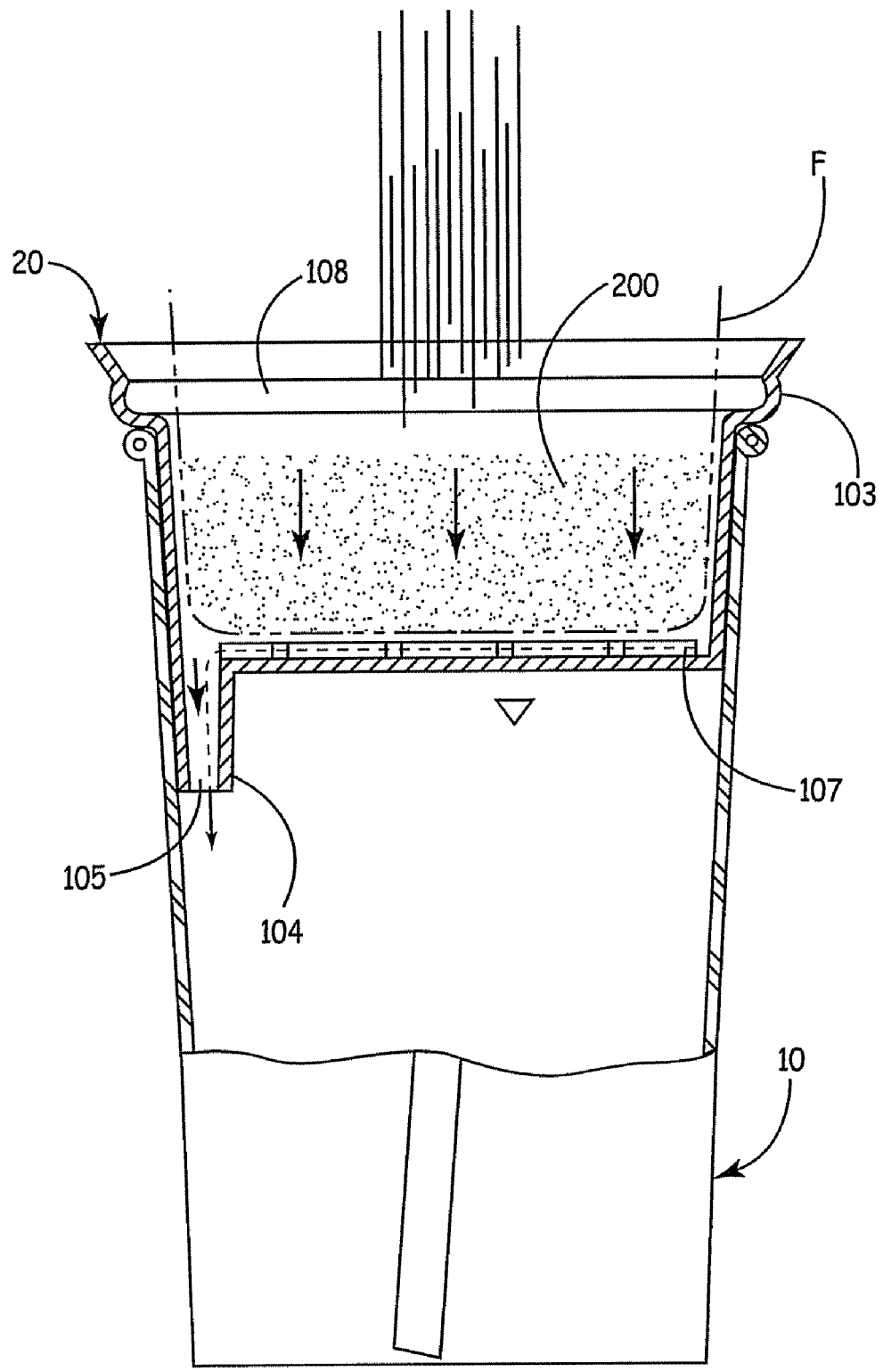
FIG. 10 is a sectional view illustrating a state where a cap of FIG. 8 is inversely fitted.

In FIG. 9, there is shown an example where the cap 20 is assembled on the coupling circumference 11 of the main body 10. In FIG. 10, the cap 20 is inversely fitted on the main body 10 and the filtering paper F is dispose din the space 108 of the cap 20. After filling ground coffee 200 in the filtering paper F and supplying water, the water is dispensed into the main body 10 through the filtering paper F.

The water passing through the filtering paper F flows downward to a flowing guide channel 107. The liquid coffee directed to the guide channel 107 is further directed to the spouting hole 105.

FIG. 11 shows another embodiment of the present invention.

In this embodiment, a cutting layer 110 with a pulling handle 112 is formed on a top of the cap with a cutting line 111 formed therebetween. In use, when the cutting layer 110 is removed by pulling the handle 112, an air intake hole 113 formed on the top of the cap is exposed.

FIG. 12 shows a modified example of a concave portion of the cap 20.

Industrial Applicability

As described above, a food/beverage container that has a dome-shaped cap that can be inversely fitted on a container body so that the container can be used for a variety of uses. That is, when the cap is normally fitted on the container body, a user can drink beverage in the container body. When the cap is inversely fitted on the container body, the use can dispose food such as ground coffee or other instant food.

Therefore, the container of the present invention can be effected used for a small vender who requires a variety of uses for a container.

Since the container of the present invention is designed for the multi->purpose, the costs for manufacturing and storing can be saved.

What is claimed is:

1. A food/beverage container comprising:
   a cup-shaped main body for containing liquid content; and
   a cap having a hemisphere body provided with a spouting portion, the cap being designed to be normally and inversely fitted on the cup-shaped main body, the cap including:
   a first coupling part along an outer circumference configured to attach to and tightly contact a coupling edge of the cup-shaped main body in a normal fitting position and an opposed second coupling part positioned opposite the first coupling part to attach to and tightly contact the coupling edge on an outer wall of the cup-shaped main body, and
   further including an inner portion configured to tightly contact an upper inner wall of the cup-shaped main body in an inversely fitting position;
   wherein the hemisphere body includes a plurality of ribs at an inner surface coextending in a direction toward the spouting portion;

wherein the spouting portion is provided with a spouting member insertion hole;

wherein the spouting member insertion hole is configured to received therethrough a spouting member, with the cap selectively in both of the normally and inversely fitted positions, to allow a user to drink contents of the cup-shaped main body through the spouting member both when the cap is in the normally fitted position and when the cap is in the inversely fitted position wherein the plurality of ribs are configured to prevent filter paper from adhering to the inner surface whereby the plurality of ribs allow dripping liquid through the filter paper to flow toward the spouting portion and into the container when the cap is in the inversely fitted position;

wherein the main body coupling edge is located at an upper end with a coupling circumference.

2. The food/beverage container of claim 1 wherein when the cap is inversely fitted, a circumference of the hemisphere body tightly contacts an inner circumference of the main body.

3. The food/beverage container of claim 1 wherein a sub-cover is further provided to cover the cap.

4. The food/beverage container of claim 1 wherein the cap is provided with an air intake portion.

5. The food/beverage container of claim 4 wherein the air intake portion is divided by a cutting line and connected to a pulling handle.

* * * * *